Aug. 28, 1934. J. M. G. FULLMAN 1,971,908

OUTLET BOX

Filed May 19, 1932 4 Sheets-Sheet 1.

INVENTOR
James M. G. Fullman
BY
Cooper, Kerr & Dunham
ATTORNEYS

Aug. 28, 1934.  J. M. G. FULLMAN  1,971,908
OUTLET BOX
Filed May 19, 1932   4 Sheets-Sheet 2
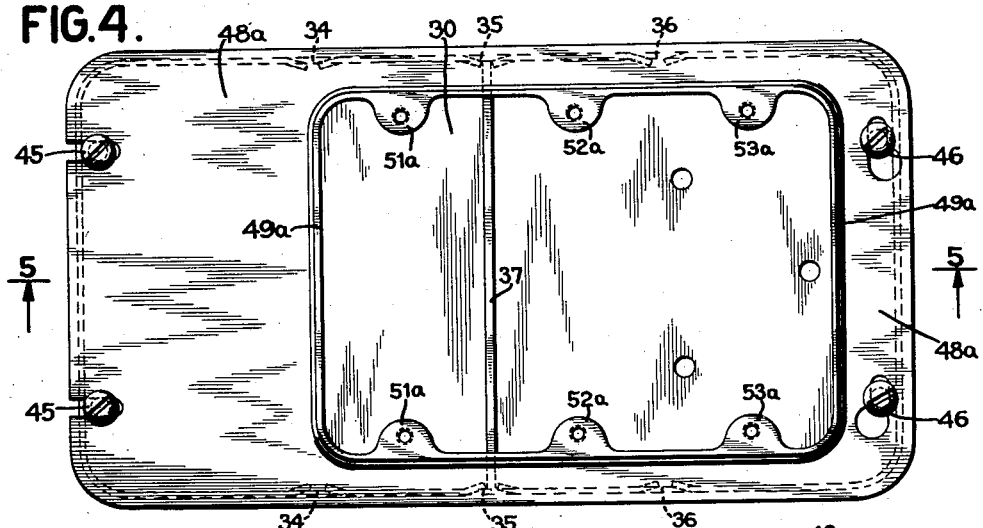
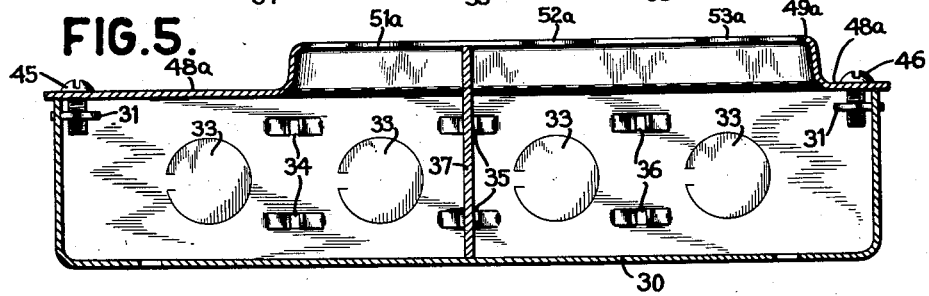
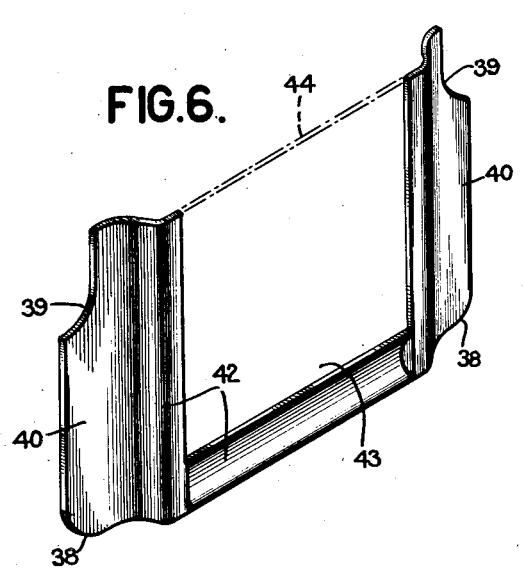
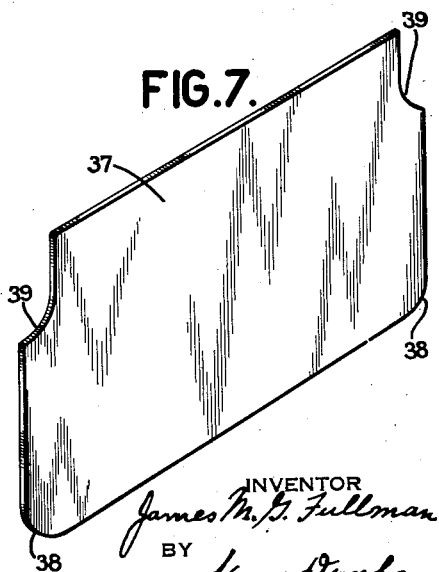
INVENTOR
James M. G. Fullman
BY
Cooper, Kerr & Dunham
ATTORNEYS Aug. 28, 1934.　　　　J. M. G. FULLMAN　　　　1,971,908
OUTLET BOX
Filed May 19, 1932　　　4 Sheets-Sheet 3

James M. G. Fullman
INVENTOR

BY
Cooper, Kerr & Thomas
ATTORNEYS

Aug. 28, 1934.        J. M. G. FULLMAN        1,971,908
OUTLET BOX
Filed May 19, 1932        4 Sheets-Sheet 4

INVENTOR
James M. G. Fullman
BY
Cooper, Kerr + Dunham
ATTORNEYS

Patented Aug. 28, 1934

1,971,908

UNITED STATES PATENT OFFICE 1,971,908

OUTLET BOX

James M. G. Fullman, Sewickley, Pa., assignor to National Electric Products Corporation, New York, N. Y., a corporation of Delaware Application May 19, 1932, Serial No. 612,215

2 Claims. (Cl. 247—15)

This invention relates to improvements in outlet boxes and more particularly to the types of outlet boxes commonly known as gang boxes in which two or more electrical devices are mounted upon the box. Such electrical devices are customarily mounted upon the raised cover of the box and such boxes are made in various sizes depending upon the number of devices to be installed upon the covers thereof. It is also the practice to employ different kinds of covers for the same box body. For example both a three gang cover and a four gang cover may be alternatively mounted upon the same box body. Recently there has been a demand for partitions in these boxes to correlate separate devices to different compartments in the box. For example, 110 volt circuits may extend into the box for certain services, and six volt circuits are desirable for buzzers, indicators, etc. As an illustration with power radio sets, one box compartment may be desirable for the service outlets to 110 volt tubes and another compartment is desired for the outlets for the aerial and ground.

The requirement for partitions in such gang boxes has hindered the interchangeability of the cover because of having to take into account the location of the outlet openings into the box and the location of the device mounting lugs upon the box covers. It may be explained that previous forms of three and four gang covers have had their mounting lugs spaced and disposed symmetrically to the center lines of the covers so that upon mounting the devices upon the covers the devices mounted upon a three gang cover would be disposed in a different relation to the box than would be the devices mounted upon a four gang cover. In fact so far as their relative location to the box proper is concerned the center lines of the devices upon a three gang cover would assume a relation midway between the center lines of devices mounted upon a four gang cover. Such discrepancies have precluded the simple disposition of partitions and have precluded a uniform spacing of knockouts. Frequently partitions interfered with knockout openings and to meet the varied demand for such boxes a great variety of special components were required. Different box bodies with different knockout arrangements and different covers were required.

The present invention has for its object the provision of an improved gang box with improved interchangeable covers, an improved arrangement of knockouts and improved partition receiving means to the general end that various covers may be placed upon one and the same box body and so that various partitions may be variously disposed in the box body and still maintain non-obstructing and non-interfering relations one with the other.

Another object of the present invention resides in the provision of an improved arrangement of box elements which will greatly reduce the number of assemblies which are required to be kept in stock.

Another object of the present invention resides in the provision of a set of interchangeable box forming elements comprising a single box body, two sizes and forms of cover and removable partitions to fit the same to enable individual users to build up different box assemblies as desired.

Further and other objects of the present invention will be hereinafter shown and described in the accompanying specification and claims and shown in the drawings, which by way of illustration show what I now consider to be a preferred embodiment of my invention.

In the drawings:

Fig. 4 is a view similar to Fig. 2, but with a modified form of box cover and with a straight partition installed in the box body;

Fig. 5 is a sectional view taken on line 5—5 of Fig. 4;

Figs. 6 and 7 are perspective views of the partition members adapted for use in the box, Fig. 6 showing an offset partition, and Fig. 7 showing a straight partition;

Figure 1:
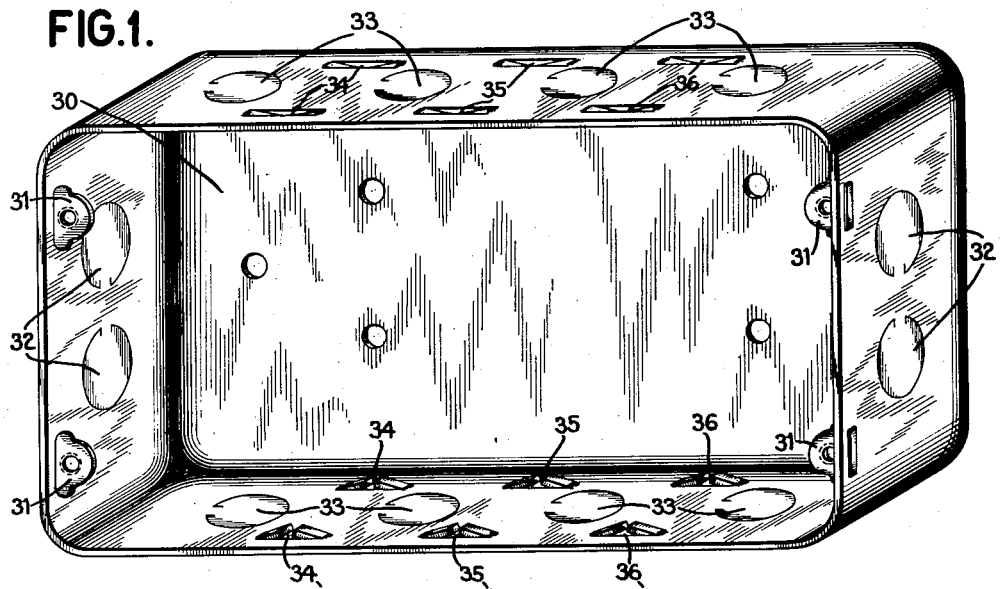
Figure 1 is a perspective view of the box body.
Figure 2:
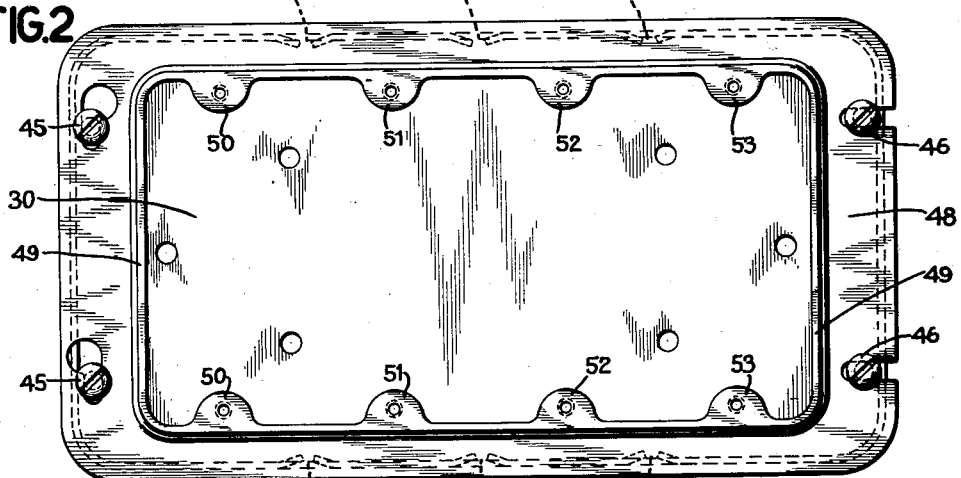
Fig. 2 is a plan view of the box cover installed upon a box body.
Figure 3:
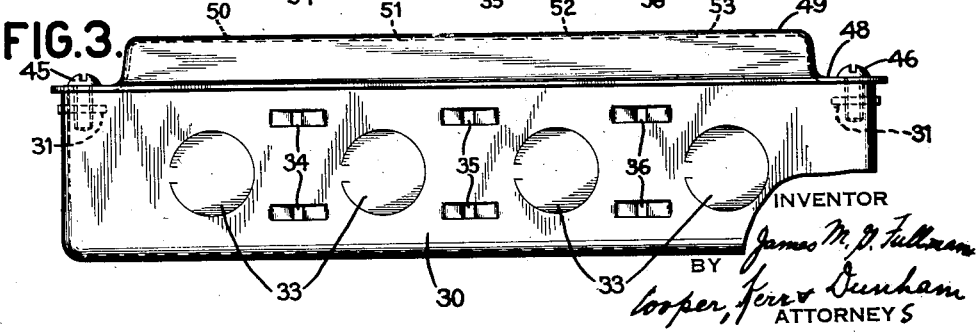
Fig. 3 is a side elevational view of box cover and box body.
Figure 8:
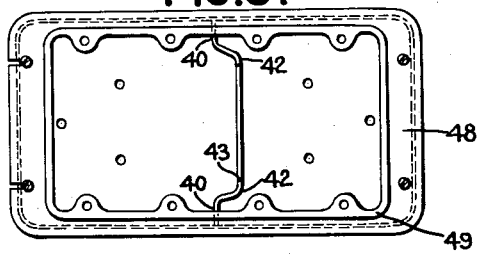
Figure 10:
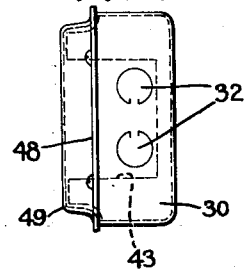
Figure 9:
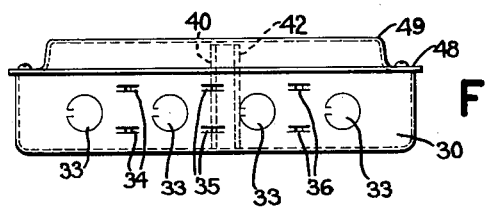
Figure 11:
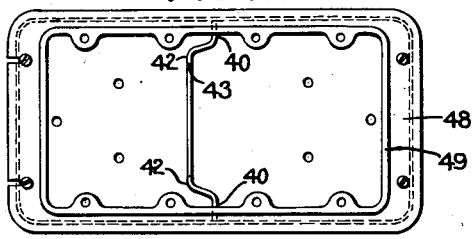
Figure 12:
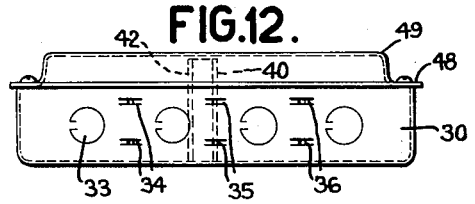

Figs. 8 to 20 inclusive show different manners of assembly of the box components including the cover portion shown in Figs. 2 and 3; and the partition elements of Figs. 6 and 7; Figs. 8 to 10 respectively show top, side elevational and end elevational views of one typical assembly; Figs. 11 and 12 are a top view and side elevational view of another assembly; and Figs. 13 and 14, Figs. 15 and 16, Figs. 17 and 18, Figs. 19 and 20 show other assemblies.

Figure 21:
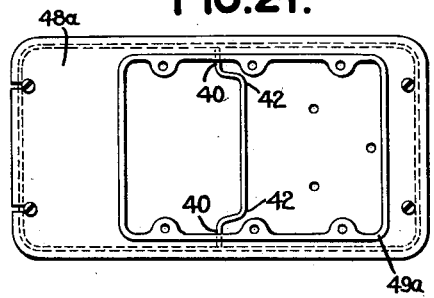
Figure 23:
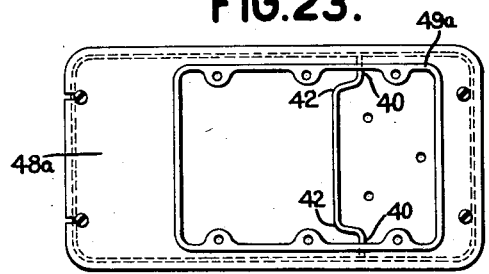
Figure 22:
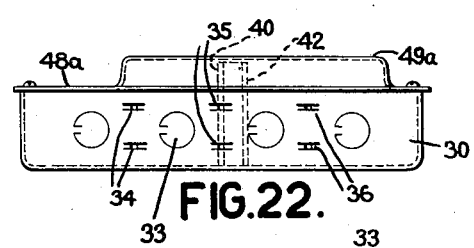
Figure 24:
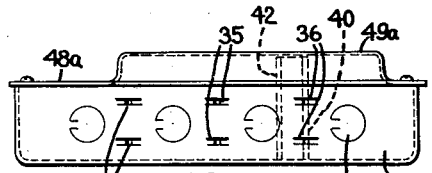

Figs. 21 and 23 are plan views; and Figs. 22 and 24 are corresponding side elevational views of other assemblies utilizing the box cover of Figs. 4 and 5.

Figure 25:
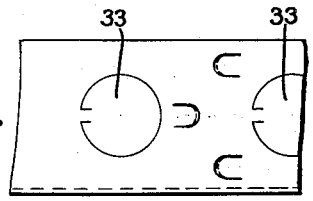

Fig. 25 shows one modified arrangement of partition supporting lugs which may be employed.

In more detail the box body or bottom portion of the box comprises a steel stamping 30 provided with the intermediate cover receiving fastening lugs 31. Preferably each end of the box bottom is provided with knockouts 32. The longer side edges of the box are provided with four sets of knockouts 33 spaced as shown in Figs. 1, 3, 5, 9, 12, etc. To selectively support the interchangeable and removable partition members, the side walls of the box are provided with inwardly deformed lugs providing therebetween partition receiving slots 34, 35 and 36. Such lugs can be arranged as shown in Fig. 5 or multiple single lugs in staggered relationship may be employed or combinations of pairs and single lugs may be used as shown in Fig. 25. By reference to Fig. 14, it will be noted that the slots 34 are disposed midway between the two left hand pairs of knockouts 33, slots 35 are disposed midway between the two center pairs of knockouts and slots 36 are disposed halfway between the right hand pair of knockouts. This arrangement is of particular utility in affording a selective disposition of the replaceable partition as will later be described.

Two forms of partitions are here shown. The form shown in Fig. 7 comprises a simple flat plate 37 with lower filleted corners 38 and upper cutaway notched portions 39. Such straight partition member 37 is adapted for disposition in any of the slots 34, 35 or 36.

Another form of partition is that shown in Fig. 6. This form may be termed "an offset partition", it having straight slot engaging edge portions 40 and an offset central portion 42. The offset central portion may be provided with an opening therethrough as indicated at 43 for uses where a device is to be accessible from both sides thereof. Alternatively the opening 43 may be omitted and may be closed by an offset connecting platelike portion 44 as shown by the dotted lines at the top of the figure. The form of removable partition shown in Fig. 6 likewise is provided with the filleted lower corner portions 38 and with the upper notched corners 39. Such offset partition plate is adapted for selective disposition in any of the partition receiving slots 34, 35 or 36.

*Interchangeable covers*

One embodiment of interchangeable cover is shown in Figs. 2 and 3. This cover 48 is provided with suitable openings and slots to receive the fastening screws 45—46 which thread into the cover securing lugs 31. The cover is provided with the customary raised intermediate portion 49 which in turn is provided with a number of perforated threaded lugs 50, 51, 52 and 53 for receiving the devices to be mounted upon the cover. By referring to Figs. 2 and 3, it will be noted that the center lines of lugs 50, 51, 52 and 53 coincide with the center line of the knockouts 33 and that the partition receiving slots 34, 35 and 36 are midway between the threaded lugs 50, 51, 52 and 53.

Figs. 4 and 5 show another form of interchangeable cover 48a. The fastening parts are the same as before and similar reference numerals apply i. e. 45. The raised part 49a of the cover is of a form to receive three devices and is provided with lugs 51a, 52a and 53a, the position of which with respect to the box conforms to the position of lugs 51, 52 and 53. It will be understood, however, that the cover can be turned end for end, in which case the 53a lugs would assume the extreme left hand position to the left of slots 34 and in alignment with the left hand knockouts 33, 52a would then assume the position between 34 and 35, and 51a would assume a position between 35 and 36.

Figs. 8 to 16 show some alternative dispositions of partitions. In Figs. 8, 9 and 10 the offset partition 40 is used and applied in slots 35. The offset provides ample clearance affording access through the 33 knockout to the right to the right hand compartment of the box.

Figs. 11 and 12 show the offset partition in reversed relation, i. e. with the offset part 42 to the left instead of to the right as in Figs. 8 and 9. Parts 40 are still engaged with slot 35.

Figure 13:
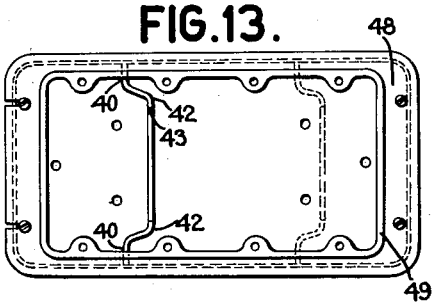
Figure 14:
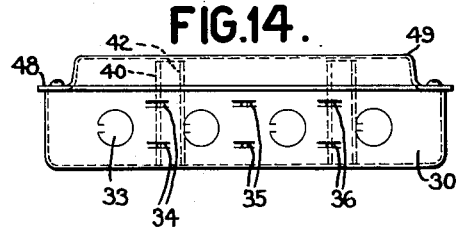

Figs. 13 and 14 show other relations in which the offset partitions may be disposed, i. e. 40 can be placed in slots 34 with 42 to the right or 40 may be placed in slots 36 with 42 still to the right.

Figure 15:
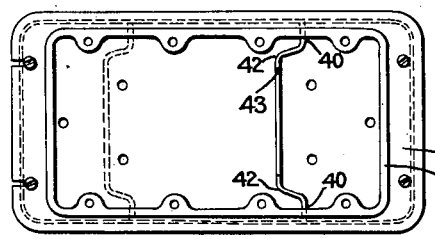
Figure 16:
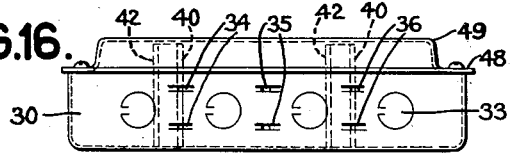

Alternatively the offset partition may be placed reversely as in Figs. 15 and 16 with 42 to the left.

From the foregoing it will be seen that whichever way the offset is disposed, ample clearance will be provided to the knockout openings.

Figure 17:
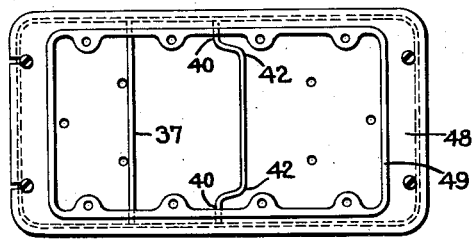
Figure 19:
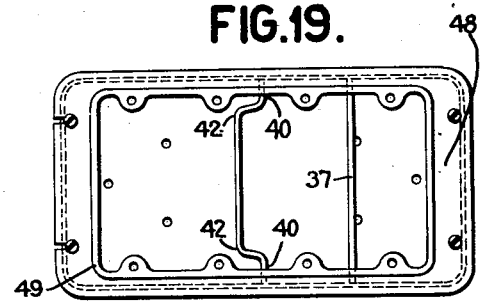
Figure 18:
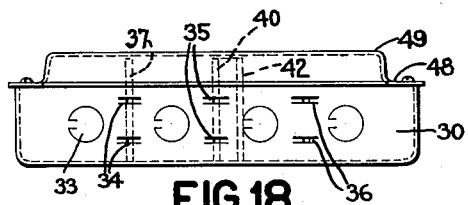
Figure 20:
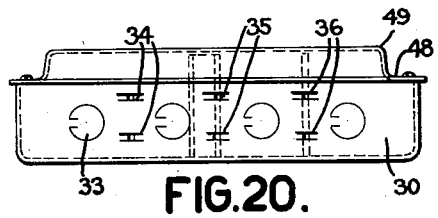

Other of the many possible partition combinations are shown in Figs. 17 to 19. In Figs. 17 and 18 straight partition 37 is in slots 34. In Figs. 19 and 20 the offset partition is in slots 35 and the straight partition in slots 36.

Figs. 21 to 24 show some of the relations in which the offset partitions may be placed with the three gang type of cover. Fig. 4 shows a straight partition 37 in the 35 slots.

The foregoing alternative assemblies and others which will be self apparent are obtainable by the use of the constructions herein set forth.

To summarize, the partition receiving slots are disposed as follows. One pair 35 are upon the center line of the box and the others 34 and 36 are symmetrically equi-distant therefrom. The knockouts are also symmetrically disposed with respect to the center line of the box as are lugs 50, 51, 52 and 53 in the four gang cover type and in the three gang cover type lugs 51a and 52a are symmetrically disposed with respect to slots 35.

With the outlet box partition receiving means and plurality of covers related as set forth it will be appreciated that interchangeability of covers is secured without detracting from the possibility of variably positioning the partition or partitions in the box. The device mounting lugs of each cover are in a maintained and same relation to the box irrespective of which cover is used and such device mounting lugs properly position a device in proper relation to the compartments in the box provided by the partition or partitions.

While the knockouts have been shown on uniform centers with the center lines thereof coinciding with the device mounting lugs and while the slots have been shown as disposed midway between the device mounting lugs and midway between the knockouts, it is obvious that slight variations from these locations are possible, but which still remain within the scope of the invention.

While preferred embodiments of the present invention have been herein shown, various changes may be made therein all within the scope and spirit of the present invention as set forth in the appended claims.

What I claim is:

1. In an outlet box, in combination, an open box portion adapted to enclose a plurality of electrical devices and having a corresponding plurality of knockout means spaced along the box portion, so that said knockout means are respectively disposed for direct centralized registration with the corresponding electrical devices, said box portion having partition-holding means intermediate adjacent knockout means adapted to receive a removable partition transversely of the box portion; and a partition adapted to be removably disposed in said partition-holding means and having an offset central portion for providing enlarged device-enclosing space on one side of the partition and constructed to permit access to adjacent knockout means on both sides thereof, said partition-holding means being adapted to receive and removably hold said partition with its offset portion extending toward either end of the aforesaid box portion, whereby the partition is reversible at will.

2. In an outlet box, in combination, an open box portion adapted to enclose a plurality of electrical devices and having partition-holding means adapted to receive a removable partition transversely of the box portion and intermediate electrical devices enclosed in the latter, and a partition adapted to be removably disposed in said partition-holding means and having an offset central portion for providing enlarged device-enclosing space on one side of the partition, said partition-holding means being adapted to receive and removably hold said partition with its offset portion extending toward either end of the aforesaid box portion, whereby the partition is reversible at will.

JAMES M. G. FULLMAN.